United States Patent
Morino et al.

(10) Patent No.: US 12,409,885 B2
(45) Date of Patent: Sep. 9, 2025

(54) STEERING SYSTEM

(71) Applicant: Toyota Jidosha Kabushiki Kaisha, Toyota (JP)

(72) Inventors: Tetsuya Morino, Susono (JP); Yuto Owaki, Susono (JP); Yoshiaki Tsuchiya, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 583 days.

(21) Appl. No.: 17/967,567

(22) Filed: Oct. 17, 2022

(65) Prior Publication Data

US 2023/0118507 A1 Apr. 20, 2023

(30) Foreign Application Priority Data

Oct. 19, 2021 (JP) .................................. 2021-170816

(51) Int. Cl.
*B62D 7/14* (2006.01)

(52) U.S. Cl.
CPC ..................................... *B62D 7/14* (2013.01)

(58) Field of Classification Search
CPC ........ B62D 7/14; B62D 15/025; B62D 6/002; B62D 5/04; B62D 5/0424; B62D 3/06; B62D 5/0448; F16H 25/20; F16H 25/24; B60K 1/02; B60K 17/046
See application file for complete search history.

(56) References Cited

U.S. PATENT DOCUMENTS

| 8,219,283 B2 * | 7/2012 | Recker | B62D 5/0472 |
| | | | 701/41 |
| 2020/0180683 A1 * | 6/2020 | Kuramitsu | B62D 5/0463 |
| 2020/0180684 A1 * | 6/2020 | Kuramitsu | B62D 5/04 |
| 2020/0385053 A1 * | 12/2020 | Mine | B62D 6/002 |
| 2021/0053615 A1 * | 2/2021 | Kondo | B62D 5/0487 |

FOREIGN PATENT DOCUMENTS

| JP | 2002-302058 A | 10/2002 |
| JP | 2010-30391 A | 2/2010 |
| JP | 2020-199794 A | 12/2020 |

* cited by examiner

*Primary Examiner* — Sizo B Vilakazi
(74) *Attorney, Agent, or Firm* — Sughrue Mion, PLLC (57) ABSTRACT

A steering system includes a controller configured to: execute a normal control to control a front-wheel steering device or a rear-wheel steering device based on a target steering angle when a steering-related frequency is determined to fall outside a resonance frequency band; and execute a limiting control when the steering-related frequency is determined to fall within the resonance frequency band. In the limiting control, the controller controls the front-wheel or rear-wheel steering device such that (i) an actual steering angle is constant at a predetermined value, (ii) an absolute value of the actual steering angle gradually decreases from a specific value, (iii) a frequency of the actual steering angle falls outside the resonance frequency band, or (iv) the absolute value of the actual steering angle is less than an absolute value of the latest value of a target extreme value that is an extreme value of the target steering angle.

9 Claims, 4 Drawing Sheets

STEERING SYSTEM

CROSS REFERENCE TO RELATED APPLICATION

The present application claims priority to Japanese Patent Application No. 2021-170816, which was filed on Oct. 19, 2021, the disclosure of which is herein incorporated by reference in its entirety.

BACKGROUND

Technical Field

The following disclosure relates to a steering system.

Description of Related Art

There has been developed in the field of a steering system of a vehicle a technique of preventing or reducing an interference between an operation of a steering wheel by a driver and steering by an actuator for steering a front wheel, by preventing or reducing noise transmitted to the actuator. A steering control device described in Japanese Patent Application Publication No. 2002-302058, for instance, separates a target yaw rate calculated based on image information obtained by a camera into a low-frequency component and a high-frequency component to control a front-wheel steering device based on the low-frequency component and a rear-wheel steering device based on the high-frequency component. Thus, the interference is prevented or reduced.

SUMMARY

In a behavior of a vehicle, resonance is considered to occur between: a steering device for steering a wheel or a vehicle motion; and steering of the wheel. When the resonance occurs, the vehicle may turn more greatly than expected by a driver, for instance. Thus, the vehicle behavior may be influenced such that the vehicle behavior increases. Such resonance is not taken into account in the steering control device described above. Thus, there remains much room for improvement in terms of prevention or reduction of an increase in the vehicle behavior.

Accordingly, an aspect of the present disclosure relates to a steering system capable of preventing or reducing an increase in a behavior of a vehicle due to resonance between: a steering device for steering a wheel or a motion of the vehicle; and steering of the wheel.

In one aspect of the present disclosure, a steering system includes: at least one of a front-wheel steering device configured to steer a front wheel and a rear-wheel steering device configured to steer a rear wheel, namely, a front-wheel steering device configured to steer a front wheel and/or a rear-wheel steering device configured to steer a rear wheel; and a controller configured to control the front-wheel steering device or the rear-wheel steering device based on a steering request. The controller is configured to: calculate a target steering angle based on the steering request; calculate a steering-related frequency that is a frequency of a steering variable related to steering; determine whether the steering-related frequency falls within a predetermined resonance frequency band; execute a normal control in which the controller controls the front-wheel steering device or the rear-wheel steering device based on the target steering angle when it is determined that the steering-related frequency falls outside the resonance frequency band; and execute a limiting control when it is determined that the steering-related frequency falls within the resonance frequency band. In the limiting control, the controller controls the front-wheel steering device or the rear-wheel steering device such that (i) an actual steering angle is constant at a predetermined value, (ii) an absolute value of the actual steering angle gradually decreases from a specific value, (iii) a frequency of the actual steering angle falls outside the resonance frequency band, or (iv) the absolute value of the actual steering angle is less than an absolute value of the latest value of a target extreme value that is an extreme value of the target steering angle.

In the steering system according to the present disclosure, the limiting control is executed when the frequency of the pre-set steering variable, which is related to steering, falls within the predetermined resonance frequency band. Examples of the steering variable include an operation angle of an operating member, an instruction value in automated driving, and an actual steering angle. In the limiting control (i), the front-wheel steering device or the rear-wheel steering device is controlled such that the actual steering angle is constant irrespective of the target steering angle. As a result, the control value or the actual steering angle does not suffer from a variation (amplitude), thus preventing or reducing occurrence of the resonance. In the limiting control (ii), the front-wheel steering device or the rear-wheel steering device is controlled such that the absolute value of the actual steering angle gradually decreases irrespective of the target steering angle, so that the control value does not suffer from a variation (amplitude), thus preventing or reducing occurrence of the resonance.

In the limiting control (iii), the front-wheel steering device or the rear-wheel steering device is controlled such that the frequency of the actual steering angle falls outside the resonance frequency band irrespective of the target steering angle, thus preventing or reducing occurrence of the resonance. In the limiting control (iv), the front-wheel steering device or the rear-wheel steering device is controlled such that the absolute value of the actual steering angle is less than the latest extreme value of the target steering angle. This configuration prevents or reduces a large behavior of the vehicle even when the resonance occurs. Thus, the steering system according to the present disclosure prevents or reduces an increase in the behavior of the vehicle due to the resonance between: the steering device for steering the wheel or the vehicle motion; and steering of the wheel.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be described below in detail a steering system 1 according to one embodiment of the present disclosure. It is to be understood that the present disclosure is not limited to the details of the following embodiment but may be embodied with various changes and modifications based on the knowledge of those skilled in the art.

Figure 1:
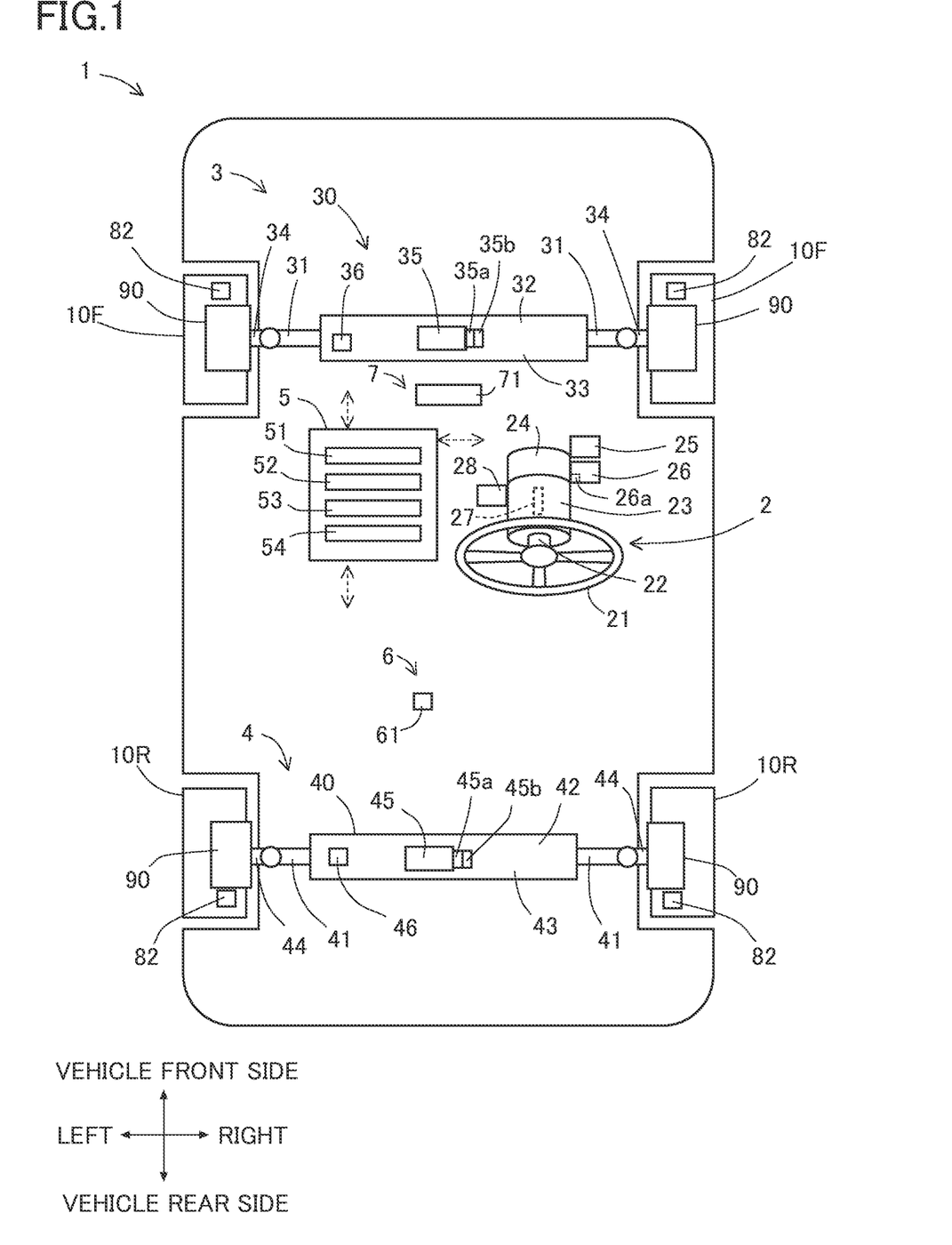
FIG. 1 is a view illustrating a configuration of a vehicle on which is installed a steering system according to the present embodiment.

As illustrated in FIG. 1, the steering system 1 according to the present embodiment includes an operation device 2, a front-wheel steering device 3, and a rear-wheel steering device 4, which are mechanically independent of one another. The front-wheel steering device 3 is configured to steer a pair of front wheels 10F. The rear-wheel steering device 4 is configured to steer a pair of rear wheels 10R. The steering system 1 further includes a steer ECU (corresponding to "controller") 5 configured to mainly control the front-wheel steering device 3 and the rear-wheel steering device 4. The steering system 1 is a steer-by-wire steering system. Hereinafter, the front wheels 10F and the rear wheels 10R will be each referred to as the wheel 10 where appropriate. In the present embodiment, the rear wheels 10R are drive wheels.

Operation Device

The operation device 2 includes: a steering wheel 21 (as one example of an operating member) operable by a driver to steer the wheels 10; a steering shaft 22 to one end of which is attached the steering wheel 21; a steering column 23 rotatably holding the steering shaft 22 and supported by an instrument panel reinforcement (not illustrated); a reaction force applying mechanism 24; and an operation angle sensor 25.

The reaction force applying mechanism 24 is configured to apply, to the steering wheel 21 via the steering shaft 22, a reaction force against a steering operation by utilizing, as a force generation source, a reaction force motor 26 supported by the steering column 23. The reaction force motor 26 is an electric motor. Hereinafter, the reaction force against the steering operation may also be referred to as "operation reaction force" where appropriate. The reaction force applying mechanism 24 has an ordinary configuration including a speed reducer, etc. The reaction force motor 26 is provided with a rotational angle sensor 26a. The operation angle sensor 25 is configured to detect an operation angle of the steering wheel 21 as a steering operation amount.

In the steering system 1, a torsion bar 27 is incorporated in the steering shaft 22, as in typical power steering systems. The operation device 2 includes an operation torque sensor 28 for detecting an operation torque based on a torsional amount of the torsion bar 27. The operation torque corresponds to an operation force applied to the steering wheel 21 by the driver.

Steering Device

The wheels 10 are supported by a body of the vehicle via respective steering knuckles 90 such that the wheels are turnable or steerable. The steering knuckles 90 are constituent elements of respective suspension devices. The front-wheel steering device 3 rotates the steering knuckles 90 to thereby steer the front wheels 10F together. The front-wheel steering device 3 includes a steering actuator 30 as a main constituent element.

The steering actuator 30 includes a steering rod 31, a housing 32, and a rod moving mechanism 33. The steering rod 31, which is also referred to as "rack bar", has opposite ends coupled to the right and left steering knuckles 90 via respective link rods 34. The housing 32 is fixedly held by the vehicle body and supports the steering rod 31 movably in the right-left direction.

The rod moving mechanism 33 is configured to move the steering rod 31 in the right-left direction utilizing a steering motor 35 as a drive source. The steering motor 35 is an electric motor. The rod moving mechanism 33 is constituted mainly by a ball screw mechanism including a ball groove formed on the steering rod 31 and a nut that is in engagement with the ball groove via bearing balls and that is rotated by the steering motor 35. The rod moving mechanism 33 has an ordinary configuration, a detailed description of which is dispensed with.

The steering motor 35 is provided with a rotational angle sensor 35a and a current sensor 35b for detecting a current supplied to the steering motor 35. The front-wheel steering device 3 includes a steering angle sensor 36 for detecting an amount of movement of the steering rod 31 in the right-left direction from its neutral position to thereby detect a steering angle, i.e., a steering amount, of the front wheels 10F. As described above, the front-wheel steering device 3 is mechanically independent of the operation force of the steering wheel 21 and constitutes a steering device of a steer-by-wire type for steering the front wheels 10F based on the force of the steering motor 35.

The rear-wheel steering device 4 rotates the steering knuckles 90 to thereby steer the rear wheels 10R together. The rear-wheel steering device 4 is similar in construction to the front-wheel steering device 3. That is, the rear-wheel steering device 4 includes a steering actuator 40 corresponding to the steering actuator 30. The steering actuator 40 includes a steering rod 41, a housing 42, a rod moving mechanism 43, and a steering motor 45, which respectively correspond to the steering rod 31, the housing 32, the rod moving mechanism 33, and the steering motor 35 of the front-wheel steering device 3. The rear-wheel steering device 4 includes link rods 44 corresponding to the link rods 34. The steering motor 45 is provided with a rotational angle sensor 45a corresponding to the rotational angle sensor 35a and a current sensor 45b corresponding to the current sensor 35b. The rear-wheel steering device 4 includes a steering angle sensor 46 for detecting an amount of the movement of the steering rod 41 of the rear wheels 10R in the right-left direction from its neutral position to thereby detect a steering angle, i.e., a steering amount, of the rear wheels 10R.

The rear-wheel steering device 4 is controlled by the steer ECU5 to steer the rear wheels 10R independently of the front wheels 10F. Like the front-wheel steering device 3, the rear-wheel steering device 4 controlled by the steer ECU 5 is mechanically independent of the operation force of the steering wheel 21 and constitutes a steering device of a steer-by-wire type for steering the rear wheels 10R based on the force of the steering motor 45. Because the rear-wheel steering device 4 is similar in construction to the front-wheel steering device 3, a detailed description of the rear-wheel steering device 4 is dispensed with.

Controller

The steer ECU 5 is an electronic control unit including a CPU, a memory, etc. The steer ECU 5 is communicably connected to the devices and the sensors via communication lines (not illustrated). A CAN (car area network or controllable area network) is used for communication in the vehicle.

The steer ECU 5 executes a steering control for steering the wheels 10 based on a steering request, namely, based on the operation angle of the steering wheel 21 in manual driving. The steer ECU 5 obtains the operation angle of the steering wheel 21 based on a rotational angle of the reaction force motor 26 detected by the rotational angle sensor 26a. Based on the obtained operation angle, the steer ECU 5 determines a target front-wheel steering angle, which is a target of the steering angle of the front wheels 10F.

Based on the target front-wheel steering angle, the steer ECU 5 determines a target rotational angle of the steering motor 35, which is a target of a rotational angle of the steering motor 35. The steer ECU 5 detects an actual rotational angle of the steering motor 35 via the rotational angle sensor 35a and determines a rotational angle deviation, which is a deviation of the actual rotational angle with respect to the target rotational angle. Here, the torque generated by the steering motor 35 is referred to as a steering torque. The steer ECU 5 determines the steering torque to be generated according to a feedback control law based on the rotational angle deviation.

Here, a current supplied to the steering motor 35 is referred to as a steering current. The steering torque and the steering current are generally proportional to each other. According to the relationship, the steer ECU 5 determines the steering current to be supplied to the steering motor 35 based on the steering torque determined as described above and supplies the steering current to the steering motor 35.

The steer ECU 5 determines a target rear-wheel steering angle, which is a target of the steering angle of the rear wheels 10R, based on the operation angle and vehicle speed information. For instance, the vehicle speed is calculated based on detection results of wheel speed sensors 82 respectively provided for the wheels 10. The steer ECU 5 controls the steering actuator 40 based on the target rear-wheel steering angle, as in the steering control of the front wheels 10F. The steer ECU 5 is capable of steering the front wheels 10F and the rear wheels 10R in the same phase or opposite phase depending on a traveling situation such as the vehicle speed. The steer ECU 5 controls the steering angle of the rear wheels 10R as needed. The steer ECU 5 may control only the steering angle of the front wheels 10F depending on the steering request and the traveling situation.

The steer ECU 5 executes a reaction force control for giving, to the driver, an operation feeling with respect to the steering operation. The steer ECU 5 determines the operation reaction force based on two components, i.e., steering-load-dependent component FS and an operation-force-dependent reduction component FA. The steering-load-dependent component FS is a component relating to a steering force (the steering torque of the steering motor 35) necessary for steering the front wheels 10F. The steering-load-dependent component FS is determined based on the steering current being supplied to the steering motor 35. Though not described in detail, it is recognized that the steering load of the front wheels 10F increases with an increase in the steering current, and the steering-load-dependent component FS is determined to be a great value.

The operation-force-dependent reduction component FA is considered as a component for giving, to the driver, an operation feeling in what is called power steering system. In the power steering system, an assist torque corresponding to the operation torque is applied to the steering shaft 22. The steer ECU 5 detects the operation torque via the operation torque sensor 28. The steer ECU 5 determines a reaction force current, which is a current to be supplied to the reaction force motor 26, based on the operation reaction force and supplies the determined reaction force current to the reaction force motor 26.

Thus, it can be said that the steer ECU 5 includes a steering control portion configured to execute the steering control and an operation control portion configured to execute the reaction force control and to control the operation device 2. The steer ECU 5 may be constituted by a plurality of ECUs. For instance, the steer ECU 5 may include an operation ECU configured to control the operation device 2, a front-wheel steering ECU configured to control the front-wheel steering device 3, and a rear-wheel steering ECU configured to control the rear-wheel steering device 4, which are communicably connected to one another. The devices and the ECU of the steer-by-wire steering system 1 have redundancy.

Normal Control and Limiting Control

The steer ECU 5 includes a target calculating portion 51, a frequency calculating portion 52, a determining portion 53, and a steering control portion 54. Processes executed by those portions 51-54 are actually executed by the steer ECU 5. For convenience of the description, functions of the steer ECU 5 are represented as those portions 51-54. The target calculating portion 51 calculates target steering angles based on the steering request. Specifically, the target calculating portion 51 calculates the target front-wheel steering angle and the target rear-wheel steering angle based on the steering request. The target front-wheel steering angle is a target value of the steering angle of the front wheels 10F, and the target rear-wheel steering angle is a target value of the steering angle of the rear wheels 10R. The steering request is, for instance, the operation angle of the steering wheel 21 (the detection value of the operation angle sensor 25) received by the steer ECU 5 or the instruction value (instruction angle) in automated driving or the like sent from other ECU and received by the steer ECU 5. The target calculating portion 51 calculates the target steering angles based on the detected operation angle and operation torque, for instance, utilizing arithmetic expressions, maps, etc.

The frequency calculating portion 52 calculates a steering-related frequency. The steering-related frequency is a frequency of a steering variable that is related to steering. The steering variable is, for instance, the operation angle of the steering wheel 21, the instruction value from other ECU in automated driving, or actual steering angles of the front wheels 10F and the rear wheels 10R (the detection values of the steering angle sensors 36, 46). The frequency calculating portion 52 calculates a steering-variable extreme value that is an extreme value of the steering variable. The frequency calculating portion 52 calculates the steering-related frequency based on a time period Ta from occurrence of the steering-variable extreme value to next occurrence of the steering-variable extreme value, namely, a time period Ta between consecutive two steering-variable extreme values.

The extreme value is a value when an inclination of a change of the value changes from plus to minus or vice versa. It can be said that the extreme value is a value when the inclination of a tangent (derivative value) is 0. A value when the inclination changes from plus to minus is a maximum value while a value when the inclination changes from minus to plus is a minimum value. The frequency calculating portion 52 calculates, namely, detects, the steering-variable extreme value based on the inclination of the change of the steering variable, for instance.

There are set, in the frequency calculating portion 52, criteria for determining whether the detected extreme value is the steering-variable extreme value. The criteria include, in addition to a positive or negative change of the inclination, a criterion that an absolute value of the steering variable is not less than a threshold and a difference between the detected extreme value and the extreme value next detected is not less than a difference threshold. This configuration prevents or reduces erroneous detection of the steering-variable extreme value due to noise. A frequency f is an inverse of a period T. The time period Ta between the consecutive two steering-variable extreme values is estimated as being equal to half the period of the steering variable. Thus, the steering-related frequency can be calculated based on the time period Ta.

The determining portion 53 determines whether the steering-related frequency falls within a predetermined resonance frequency band. In the determining portion 53, there are set, as the predetermined resonance frequency band, resonance frequency bands of the actuators 30, 40, each of which is a subject of a limiting control (which will be later described) and a resonance frequency band of a vehicle motion system. In the present embodiment, the subject for which the limiting control is executed is the rear-wheel steering device 4. Accordingly, the determining portion 53 stores at least the resonance frequency band of the actuator 40 of the rear-wheel steering device 4 and the resonance frequency band of the vehicle motion system.

The resonance frequency band of the vehicle motion system is a resonance frequency band of the vehicle in motion. The resonance frequency band of the vehicle motion system changes depending on the vehicle speed, for instance. It can be said that, in a Bode diagram of a second-order lag system, the resonance frequency of the vehicle motion system is a frequency range (horizontal axis) over which a gain (vertical axis) is relatively high. The gain corresponds to a value obtained by dividing a yaw rate (or lateral acceleration) by the operation angle, i.e., yaw rate/operation angle. When the steering wheel 21 is operated rightward and leftward continuously and the vehicle accordingly turns rightward and leftward, turning (behavior) of the vehicle becomes large when the frequency of the operation angle becomes equal to a certain frequency. It can be said that, in this instance, the frequency of the operation angle falls within the resonance frequency band of the vehicle motion system. The resonance frequency band of the vehicle motion system is set for every vehicle speed.

The resonance frequency band of the actuator 40 is, for instance, a frequency band of resonance that arises from a feedback control executed for the steering motor 45. Also in this instance, it can be said that, in a Bode diagram of a second-order lag system, the resonance frequency of the actuator 40 is a frequency range (horizontal axis) over which a gain (vertical axis) is relatively high. In the feedback control, the steering current (control current) to be supplied to the steering motor 45 is determined based on a difference between the target steering angle and the actual steering angle such that the difference is small. The steer ECU 5 calculates the steering current by multiplying the difference by a predetermined coefficient (parameter), for instance.

In the feedback control of the motor, output of the motor tends to suffer from a delay as the frequency of input signals to the motor becomes higher. Accordingly, in a case where the input signals with a certain frequency continues to be input, the difference becomes greater and the steering current becomes greater, so that resonance occurs. The resonance frequency band of the actuator 40 can be changed by changing the coefficient (parameter) in the calculation of the feedback control, for instance. The same applies to the resonance frequency band of the actuator 30. The resonance frequency band of the vehicle motion system and the resonance frequency bands of the actuators 30, 40 are obtained in advance by experiments and simulations.

The determining portion 53 in the present embodiment utilizes, as the steering-related frequency, the frequency of the operation angle of the steering wheel 21 in the case of manual driving and the frequency of the instruction value in the case of automated driving. In the case of manual driving, the determining portion 53 determines based on the detection value of the operation angle sensor 25 whether the frequency of the operation angle falls within the resonance frequency band of the actuator 40 and whether the frequency of the operation angle falls within the resonance frequency band of the vehicle motion system.

When the determining portion 53 determines that the steering-related frequency falls outside the resonance frequency band, the steering control portion 54 executes a normal control in which the rear-wheel steering device 4 is controlled based on the target rear-wheel steering angle. The steering control portion 54 executes, for the front-wheel steering device 3, the normal control that is based on the target front-wheel steering angle irrespective of the steering-related frequency.

The steering control portion 54 executes the limiting control when it is determined by the determining portion 53 that the steering-related frequency falls within the resonance frequency band. In the limiting control, the rear-wheel steering device 4 is controlled such that (i) the actual steering angle is constant at a predetermined value, (ii) the absolute value of the actual steering angle gradually decreases from a specific value, (iii) a frequency of the actual steering angle falls outside the resonance frequency band, or (iv) the absolute value of the actual steering angle is less than an absolute value of the latest value of a target extreme value that is an extreme value of the target rear-wheel steering angle. The limiting control stops being executed, namely, the limiting control is canceled, when the steering-related frequency falls outside the resonance frequency band. In the limiting control according to the present embodiment, the rear-wheel steering device 4 is controlled such that the actual steering angle is constant at the predetermined value. The predetermined value is set to 0 in the present embodiment.

When the number of determinations of the steering-variable extreme value by the frequency calculating portion 52 becomes greater than or equal to an extreme-value determination threshold (e.g., three in the present embodiment) after the steering-related frequency has fallen within the resonance frequency band, the steering control portion 54 causes the target rear-wheel steering angle to be constant at 0 on condition that the absolute value of the target rear-wheel steering angle is not greater than a switching threshold. The switching threshold is set to the predetermined value (here, 0) or a value around the predetermined value. The extreme-value determination threshold is set such that the limiting control is not executed for an emergency avoidance operation of the steering wheel 21.

In a stage where the steering-variable extreme value is detected consecutively two times, there is a possibility that the calculated steering-related frequency arises from the emergency avoidance operation. In this stage, the limiting control is not executed and the actual steering angle of the rear-wheel steering device 4 is not limited even if the steering-related frequency falls within the resonance frequency band. When the steering-variable extreme value is detected three times, namely, when the third steering-variable extreme value is determined while the steering-related frequency keeps falling within the resonance frequency band, the steer ECU 5 turns on a flag for allowing execution of the limiting control (hereinafter referred to as "limit flag"), so that execution of the limiting control is allowed. In other words, the limit flag is turned on when the steering-related frequency obtained based on the first steering-variable extreme value and the second steering-variable extreme value falls within the resonance frequency band and the steering-related frequency obtained based on the second steering-variable extreme value and the third steering-variable extreme value falls within the resonance frequency band. The extreme-value determination threshold is set to a value equal to three or more so as to prevent the limiting control from hindering the emergency avoidance.

When the steering-related frequency obtained based on the first steering-variable extreme value and the second steering-variable extreme value falls within the resonance frequency band, the steer ECU 5 may turn on the limit flag on condition that the third steering-variable extreme value is detected within a predetermined time period after detection of the second steering-variable extreme value. In this instance, even if the steering-related frequency obtained based on the second steering-variable extreme value and the third steering-variable extreme value falls outside the resonance frequency band, the limit flag is turned on in response to detection of the third steering-variable extreme value.

When the absolute value of the target steering angle becomes less than or equal to the switching threshold (here, 0) in the state in which the limit flag is on, the control mode is changed from the normal control to the limiting control, namely, the limiting control is executed, and the target rear-wheel steering angle is made equal to 0. While the limiting control is being executed, the target rear-wheel steering angle is maintained to be 0. In the present embodiment, the switching threshold is set to the predetermined value in the limiting control or the value around the predetermined value. With this configuration, the target rear-wheel steering angle is prevented from abruptly and greatly changing at a time when the limiting control is initiated. The limiting control is continuously executed until the steering-related frequency falls outside the resonance frequency band.

Figure 2:
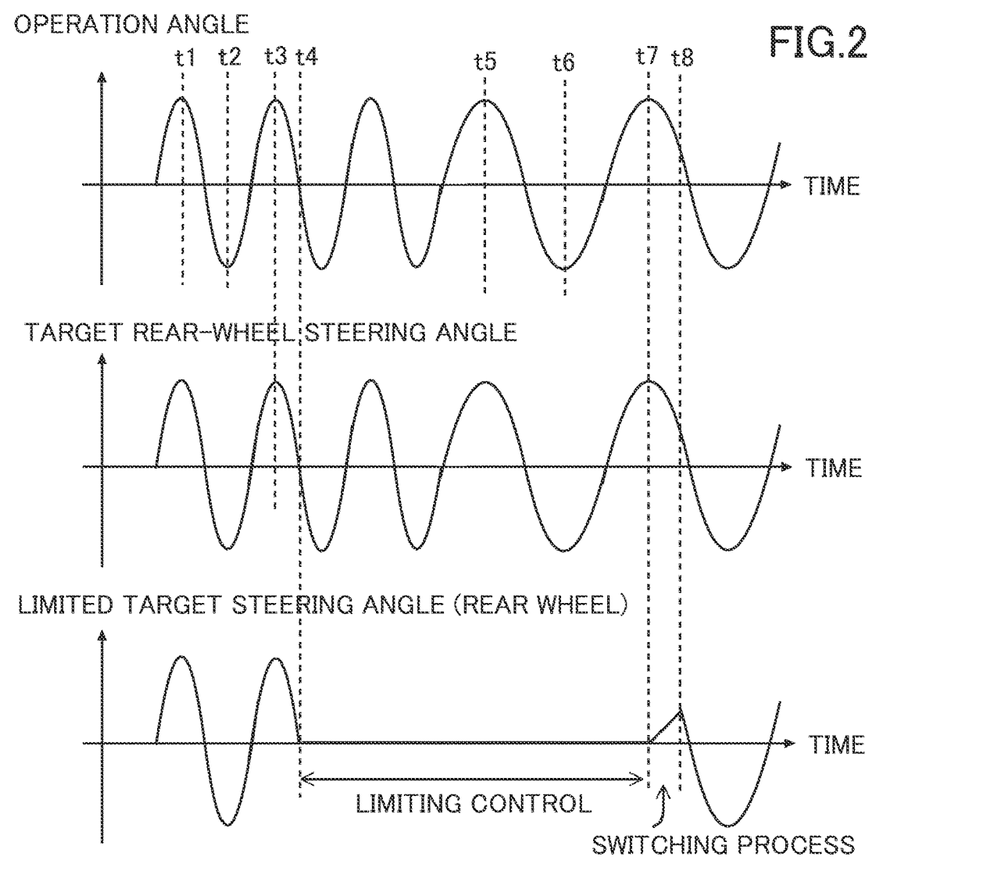
FIG. 2 is a time chart for explaining a limiting control in the present embodiment.

As illustrated in FIG. 2, for instance, the steer ECU 5 detects a steering-variable extreme value of the input operation angle at time t1 and subsequently detects a next steering-variable extreme value of the input operation angle at time t2. The steer ECU 5 calculates a time period (t2−t1) between the steering-variable extreme value of the input operation angle and the next steering-variable extreme value of the input operation angle. Based on the calculation result, the steer ECU 5 calculates the frequency of the operation angle. The steer ECU 5 determines whether the frequency of the operation angle falls within the predetermined resonance frequency band. Here, the steer ECU 5 determines whether the frequency of the operation angle falls within the resonance frequency band of the actuator 40. It is noted that the steer ECU 5 similarly determines whether the frequency of the operation angle falls within the resonance frequency band of the vehicle motion system. However, the determination as to the resonance frequency band of the vehicle motion system is not explained here.

When the frequency of the operation angle falls within the resonance frequency band of the actuator 40, the steer ECU 5 measures the number of the steering-variable extreme values that are used in the frequency calculation. When the number of the consecutive steering-variable extreme values becomes equal to the extreme-value determination threshold, the steer ECU 5 allows the limiting control to be executed. In this example, the extreme-value determination threshold is set to three. Thus, the limit flag is turned on when the steer ECU 5 determines two times consecutively that the frequency of the operation angle falls within the resonance frequency band of the same subject, specifically, the resonance frequency band of the actuator 40. That is, after it is determined at time t2 that the frequency of the operation angle falls within the resonance frequency band of the actuator 40, a time period (t3−t2) from the steering-variable extreme value at time t2 to the steering-variable extreme value at time t3 is calculated at time t3 at which the steering-variable extreme value is detected. The limit flag is turned on when the frequency of the operation angle calculated based on the time period (t3−t2) falls within the resonance frequency band of the same subject (the actuator 40). That is, the limit flag is turned on at time t3 in this example. It is noted that the target extreme value (the extreme value of the target rear-wheel steering angle) at time t3 corresponds to the latest value of the target extreme value (the most recent target extreme value) before execution of the limiting control.

When the absolute value of the target rear-wheel steering angle becomes equal to the switching threshold (here, 0) in the state in which the limit flag is on, the limiting control is executed (time t4). The target rear-wheel steering angle is made equal to 0 by execution of the limiting control until when it is determined that the frequency of the operation angle falls outside the resonance frequency band of the actuator 40, namely, the target rear-wheel steering angle is equal to 0 from time t4 to time t7. During the limiting control, the determination as to whether the frequency of the operation angle falls within the resonance frequency band is made based on the extreme-value determination threshold (the consecutive three extreme values) as described above. In other words, when the frequency based on time t5 and time t6 falls outside the resonance frequency band and the frequency based on time t6 and time t7 falls outside the resonance frequency band, it is determined that the frequency of the operation angle falls outside the resonance frequency band. The extreme-value determination threshold in the limiting control may be different from the extreme-value determination threshold in the normal control. For instance, the extreme-value determination threshold in the limiting control may be equal to two.

When it is determined that the frequency of the operation angle falls outside the resonance frequency band of the actuator 40 (time t7), the steer ECU 5 executes a switching process for gradually bringing a limited target steering angle, which is a target value in the limiting control, closer to the target rear-wheel steering angle not limited. When the limited target steering angle becomes equal to the target rear-wheel steering angle (time t8), the normal control is initiated. In this example, the control mode is switched from the limiting control to the normal control between which the switching process is executed. The normal control is executed from time t8, and comparison of the frequency of the operation angle and the resonance frequency band is continuously carried out. The control described above is similarly executed in comparison of the steering-related frequency and the resonance frequency band of the vehicle motion system. In a case where a difference between the limited target steering angle at time t7 and the target steering angle at time t7 is not greater than a predetermined return determination threshold, the steer ECU 5 may switch the control mode from the limiting control to the normal control without executing the switching process.

According to the present embodiment, the limiting control is executed when the frequency of the steering variable that is related to steering falls within the predetermined resonance frequency band. In the limiting control of the present embodiment, the actual steering angle of the rear wheels 10R is controlled so as to be constant irrespective of the target rear-wheel steering angle. With this configuration, the control value (the actual steering angle) does not suffer from a variation (amplitude), thus preventing or reducing occurrence of the resonance. That is, the steering system according to the present embodiment suppresses an increase in the behavior of the vehicle due to the resonance between: the steering device for steering the wheel or the vehicle motion; and steering of the wheel.

In the limiting control, the rear wheels 10R are controlled such that the actual steering angle is constant at 0. This configuration prevents the rear wheels 10R from hindering the behavior of the vehicle by steering of the front wheels 10F. That is, the actual steering angle of the front wheels 10F is controlled based on the target front-wheel steering angle, and the actual steering angle of the rear wheels 10R is constant at 0, thus preventing or reducing the resonance of the rear wheels 10R while achieving the target steering angle of the front wheels 10F. Thus, the steering control portion 54 is configured to execute the normal control for the front-wheel steering device 3 irrespective of the steering-related frequency and to selectively execute the normal control and the limiting control for the rear-wheel steering device 4 based on the steering-related frequency and the resonance frequency bands. This configuration achieves both the response of the vehicle and the stability of the behavior of the vehicle.

Figure 3:
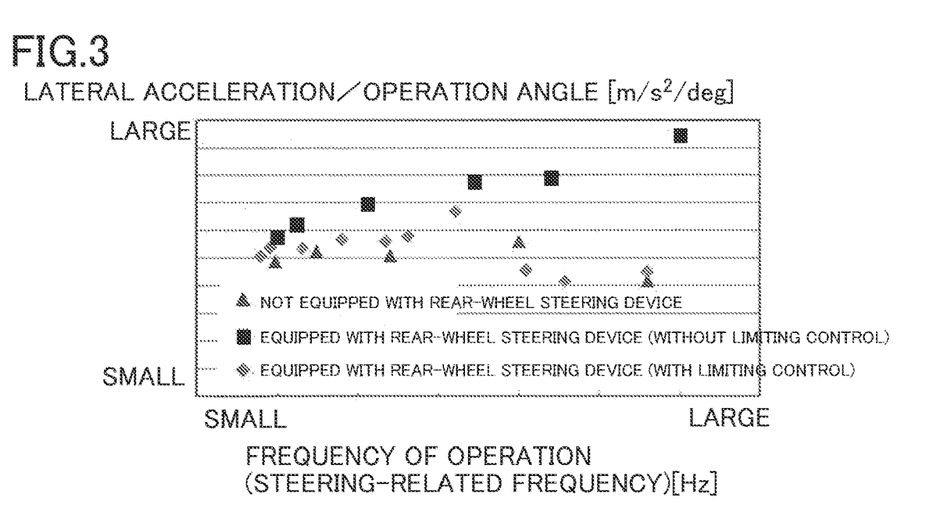
FIG. 3 is a graph illustrating experimental results in the present embodiment.

In the graph of FIG. 3, there are plotted measured values of a first vehicle and a second vehicle, which are equipped with the front-wheel steering device 3 and the rear-wheel steering device 4. Specifically, diamond-shaped marks indicate measured values of the first vehicle in which the limiting control is executed for the rear-wheel steering device 4, and square marks indicate measured values of the second vehicle in which the limiting control is not executed for the rear-wheel steering device 4. In the graph of FIG. 3, there are further plotted measured values of a third vehicle equipped with only the front-wheel steering device 3. Specifically, rectangular marks indicate the measured values of the third vehicle. In the graph of FIG. 3, the horizontal axis represents the frequency of the operation angle as one example of the steering-related frequency, and the vertical axis represents lateral acceleration/the operation angle. The greater the value of the vertical axis, the greater the behavior of the vehicle. The limiting control here is the limiting control described in the present embodiment.

The following is observed from comparison of the measurement results between the first vehicle and the second vehicle illustrated in the graph of FIG. 3. In a range in which the steering-related frequency is higher than a specific frequency, the measured values of the first vehicle (with the limiting control) are smaller than the measured values of the second vehicle (without the limiting control), and the measured values of the first vehicle are similar to the measured values of the third vehicle. In the second vehicle, the resonance occurs after the frequency of the operation angle falls within the resonance frequency band, and the lateral acceleration/the operation angle is large at frequencies higher than the frequency when falling within the resonance frequency band. In the first vehicle, the limiting control is executed. Accordingly, the resonance is prevented even after the frequency of the operation angle falls within the resonance frequency band, and the lateral acceleration/the operation angle is as small as that in the third vehicle at frequencies higher than the frequency when falling within the resonance frequency band. Thus, execution of the limiting control suppresses an increase in the behavior of the vehicle.

The predetermined value is 0. Thus, in the limiting control, the absolute value of the actual steering angle is less than the absolute value of the latest value of the target extreme value, which is the extreme value of the target rear-wheel steering angle. With this configuration, the absolute value of the control value is made smaller than the target value, so that the increase in the behavior of the vehicle is suppressed even if the resonance occurs. In the present embodiment, the steering-related frequency is calculated based on the time period from occurrence of the steering-variable extreme value to next occurrence of the steering-variable extreme value. This configuration enables calculation of the frequency that corresponds to actual input values.

One Example of Flow of Control

Figure 4:
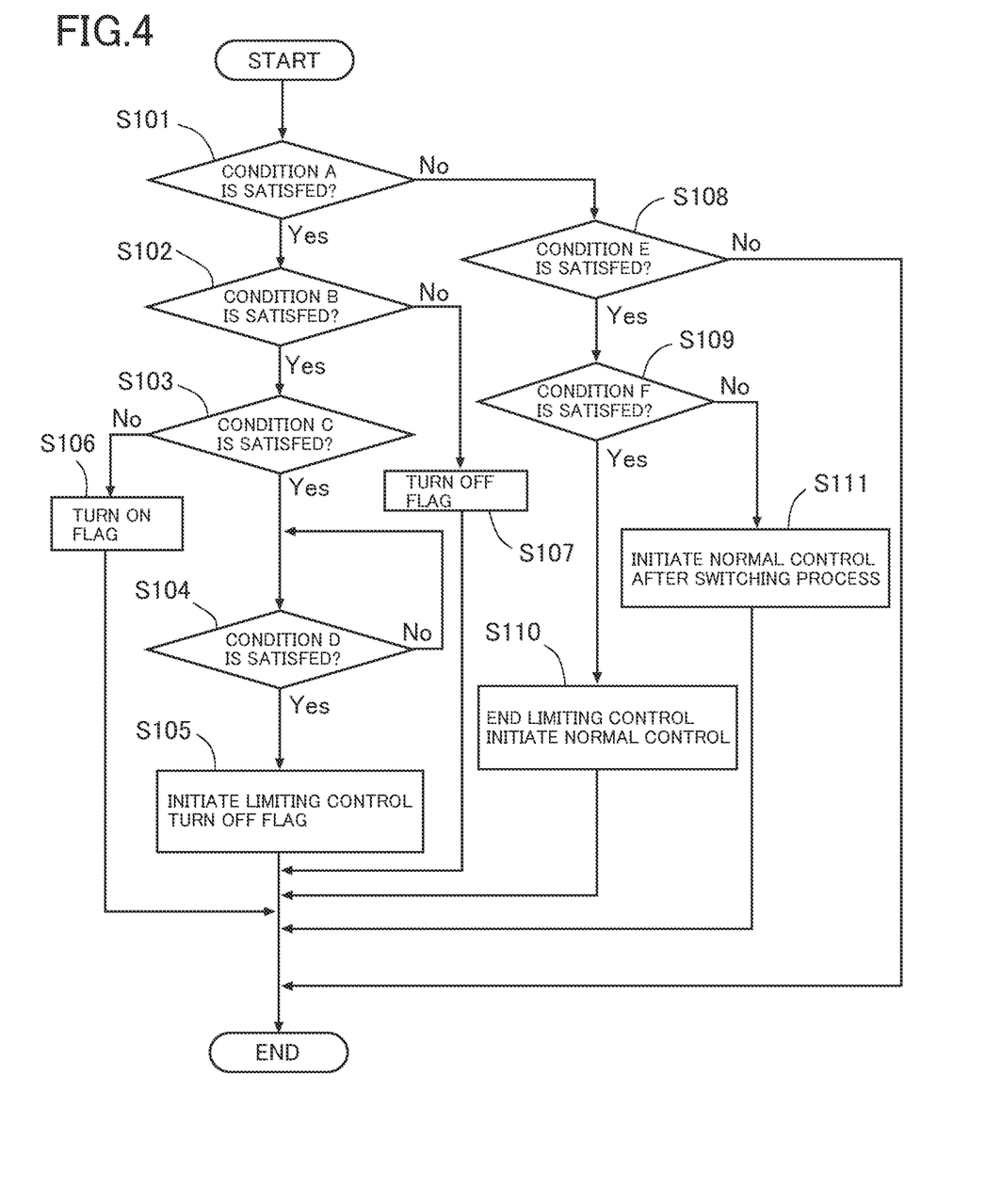
FIG. 4 is a flowchart illustrating one example of a flow of control in the present embodiment.

Referring to FIG. 4, there will be described one example of a flow of control. The steer ECU 5 determines whether a condition A is satisfied, namely, whether the normal control is currently in progress, namely, whether the limiting control is currently not in progress (S101). When the condition A is satisfied, namely, when the normal control is currently in progress (S101: Yes), the steer ECU 5 determines whether a condition B is satisfied, namely, whether the steering-related frequency falls within the resonance frequency band (S102), i.e., a determination lower-limit value of the resonance frequency≤the steering-related frequency≤a determination upper-limit value of the resonance frequency.

When the condition B is satisfied, namely, when the steering-related frequency falls within the resonance frequency band (S102: Yes), the steer ECU 5 determines whether a condition C is satisfied, namely, whether the number of the consecutive steering-variable extreme values that satisfy the condition B becomes equal to the extreme-value determination threshold, specifically here, whether the condition B is satisfied for the consecutive three steering-variable extreme values (S103). The steer ECU 5 determines at Step S103 that the condition C is satisfied when a count flag (that will be later described) is on.

When the condition C is satisfied, namely, when the number of the consecutive steering-variable extreme values that satisfy the condition B becomes equal to the extreme-value determination threshold (S103: Yes), the steer ECU 5 determines whether a condition D is satisfied, namely, whether the target rear-wheel steering angle becomes equal to the predetermined value (here, 0) (S104). When the target rear-wheel steering angle becomes equal to 0 to satisfy the condition D (S104: Yes), the steer ECU 5 initiates the limiting control and turns off the count flag (S105).

When the condition C is not satisfied (S103: No), the steer ECU 5 turns on the count flag (S106). When the condition B is not satisfied at Step S102 (S102: No), the steer ECU 5 turns off the count flag (S107). In a case where the steer ECU 5 utilizes a count function for measuring the number of the consecutive steering-variable extreme values that satisfy the condition B, Step S106 includes a process of incrementing the number of counts while Steps S105, S107 include a process of resetting the number of counts.

When the condition A is not satisfied, namely, when the limiting control is currently in progress (S101: No), the steer ECU 5 determines whether a condition E is satisfied, namely, whether the steering-related frequency falls outside the resonance frequency band, i.e., the steering-related frequency<the determination lower-limit value of the resonance frequency or the steering-related frequency>the determination upper-limit value of the resonance frequency (S108). When the condition E is satisfied, namely, when the steering-related frequency falls outside the resonance frequency band (S108: Yes), the steer ECU 5 determines whether a condition F is satisfied, namely, whether a difference between the limited target steering angle and the target rear-wheel steering angle is not greater than the return determination threshold (S109).

When the condition F is satisfied, namely, when the difference between the limited target steering angle and the target rear-wheel steering angle is not greater than the return determination threshold (S109: Yes), the steer ECU 5 ends the limiting control and initiates the normal control (S110). That is, when the condition F is satisfied, the steer ECU 5 switches the control mode from the limiting control to the normal control. When the condition F is not satisfied, namely, when the difference between the limited target steering angle and the target rear-wheel steering angle is greater than the return determination threshold (S109: No), the steer ECU 5 executes the switching process to change the limited target steering angle such that the limited target steering angle is gradually brought closer to the target rear-wheel steering angle and initiates the normal control at a time point when the limited target steering angle and the target rear-wheel steering angle coincide with each other (S111). This suppresses an abrupt change of the target value. The steer ECU 5 repeatedly executes the processing described above. In the above description with respect to the control flow, the term "resonance frequency" is representatively used. The term "resonance frequency" may be read as "the resonance frequency of the actuator" or "the resonance frequency of the vehicle motion system".

The present disclosure may be represented as follows.

(1) A steering system, including:
  at least one of a front-wheel steering device configured to steer a front wheel and a rear-wheel steering device configured to steer a rear wheel; and
  a controller configured to control the front-wheel steering device or the rear-wheel steering device in response to a steering request,
  wherein the controller is configured to:
    calculate a target steering angle based on the steering request;
    calculate a steering-related frequency that is a frequency of a steering variable related to steering;
    determine whether the steering-related frequency falls within a predetermined resonance frequency band;
    execute a normal control in which the controller controls the front-wheel steering device or the rear-wheel steering device based on the target steering angle when it is determined that the steering-related frequency falls outside the resonance frequency band; and
    execute a limiting control when it is determined that the steering-related frequency falls within the resonance frequency band, and
  wherein, in the limiting control, the controller controls the front-wheel steering device or the rear-wheel steering device such that (i) an actual steering angle is constant at a predetermined value, (ii) an absolute value of the actual steering angle gradually decreases from a specific value, (iii) a frequency of the actual steering angle falls outside the resonance frequency band, or (iv) the absolute value of the actual steering angle is less than an absolute value of the latest value of a target extreme value that is an extreme value of the target steering angle.

(2) The steering system according to the form (1),
  wherein the controller is configured to:
    calculate a steering-variable extreme value that is an extreme value of the steering variable; and
    calculate the steering-related frequency based on a time period from occurrence of the steering-variable extreme value to next occurrence of the steering-variable extreme value.

(3) The steering system according to the form (1),
  wherein, in the limiting control, the controller controls the front-wheel steering device or the rear-wheel steering device such that the actual steering angle is constant at the predetermined value, and
  wherein an absolute value of the predetermined value is less than the absolute value of the latest value of the target extreme value that is the extreme value of the target steering angle.

(4) The steering system according to the form (3), wherein the predetermined value is 0.

(5) The steering system according to the above form (1),
  wherein, in the limiting control, the controller controls the front-wheel steering device or the rear-wheel steering device such that the absolute value of the actual steering angle gradually decreases from the specific value, and
  wherein an absolute value of the specific value is less than the absolute value of the latest value of the target extreme value that is the extreme value of the target steering angle.

(6) The steering system according to the above form (1), wherein the front-wheel steering device or the rear-wheel steering device to be controlled by the controller is a steering device of a steer-by-wire type that is mechanically independent of an operation force of an operating member and is configured to steer a wheel based on a force of a steering motor.

(7) The steering system according to the above form (1), wherein, in the limiting control, the controller controls the front-wheel steering device or the rear-wheel steering device based on a limited target steering angle obtained by modifying the target steering angle.

(8) The steering system according to the above form (6), wherein, in the limiting control, the controller changes a parameter utilized in calculation relating to the steering motor.

(9) The steering system according to the above form (1), wherein the controller is configured to execute the normal control for the front-wheel steering device irrespective of the steering-related frequency and to selectively execute the normal control and the limiting control for the rear-wheel steering device based on the steering-related frequency and the resonance frequency band.

Modifications

In the limiting control (i), the rear-wheel steering device 4 is controlled such that the actual steering angle is constant at the predetermined value. Further, an absolute value of the predetermined value is less than the absolute value of the latest value of the target extreme value. For instance, the predetermined value is set to 0 as in the present embodiment.

Figure 5:
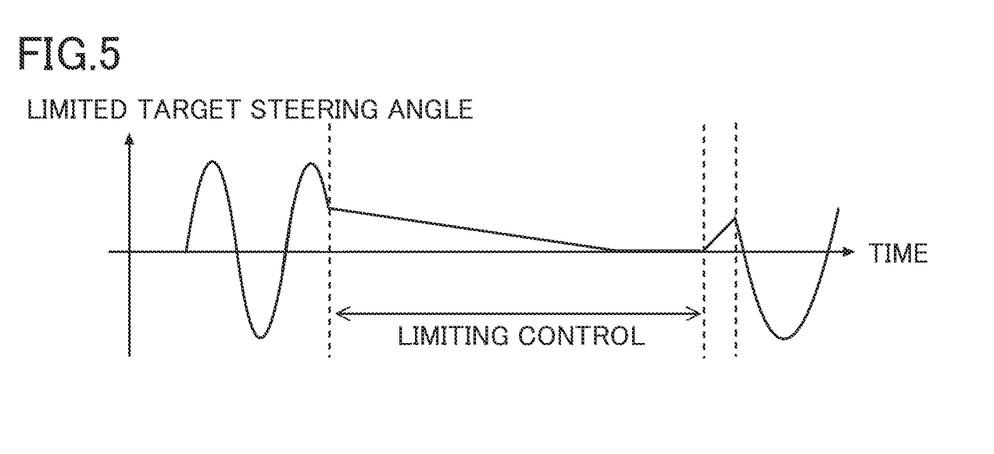
FIG. 5 is a time chart for explaining other examples of the limiting control.

The limiting control may be executed otherwise. There will be hereinafter described other examples of the limiting control. In the limiting control (ii), the steer ECU 5 may control the rear-wheel steering device 4 such that the absolute value of the actual steering angle gradually decreases from the specific value, as illustrated in FIG. 5. Also with this configuration, the control value does not suffer from a variation (amplitude), thus suppressing occurrence of the resonance. In this example, the specific value is set so as to be less than the absolute value of the latest value of the target extreme value, thus more effectively suppressing an increase in the behavior of the vehicle. As illustrated in FIG. 5, the limiting control may be executed such that, after the gradually decreased steering angle becomes equal to 0, the actual steering angle may be kept constant at 0 until the limit flag is canceled. That is, the limiting control (i) may be executed after execution of the limiting control (ii). Thus, the steer ECU 5 may change the manner (type) of the limiting control during the limiting control.

In the limiting control (iii), the steer ECU 5 may control the rear-wheel steering device 4 such that the frequency of the actual steering angle falls outside the resonance frequency band. With this configuration, the frequency of the control value also falls outside the resonance frequency band, thus suppressing occurrence of the resonance. However, it is relatively highly probable that a discrepancy is present between the operation angle and the actual steering angle in the limiting control (iii). In this respect, the liming controls (i), (ii), (iv) other than the limiting control (iii) are preferable in terms of the operation feeling felt by the driver.

In the limiting control (iv), the steer ECU 5 may control the rear-wheel steering device 4 such that the absolute value of the actual steering angle is less than the absolute value of the latest value of the target extreme value. With this configuration, even when the resonance occurs without the steering-related frequency being changed, the magnitude of the behavior of the vehicle, e.g., the degree of turning of the vehicle, is small. As described above, the steering system according to the present disclosure suppresses the increase in the vehicle behavior due to the resonance between: the rear-wheel steering device 4 or the vehicle motion; and steering of the wheel.

The limiting controls (i)-(iv) including the present embodiment are executable for the front-wheel steering device 3. For instance, the steer ECU 5 can execute the limiting control for the front-wheel steering device 3 and execute the normal control for the rear-wheel steering device 4. The steer ECU 5 may be configured such that, when an initiating condition of the limiting control is satisfied, the steer ECU 5 executes the limiting control for one of the front-wheel steering device 3 and the rear-wheel steering device 4 and executes the normal control for the other of the front-wheel steering device 3 and the rear-wheel steering device 4. Also in a case where the steer ECU 5 executes the limiting control for the front-wheel steering device 3 in the vehicle equipped with only the front-wheel steering device 3, the behavior of the vehicle can be suppressed though a discrepancy may be generated between the operation angle and the actual steering angle depending on the type of the limiting control.

In the limiting control according to the embodiment illustrated above, the actual steering angle is controlled based on the limited target steering angle obtained by modifying, namely, by limiting, the target steering angle. The actual steering angle may be controlled otherwise in the limiting control. In the limiting control, the steering control portion 54 may change the parameter utilized in calculation relating to the steering motor 45, for instance. The control of the actual steering angle in the limiting control may be executed such that a coefficient (parameter), which is to be multiplied by the difference between the target steering angle and the actual steering angle, is changed in calculation for converting the difference to the steering current to be supplied to the steering motor 45.

According to the present disclosure, the actual steering angle is controlled to be in the predetermined state in the limiting control. Thus, the present disclosure is applicable to not only the steer-by-wire steering system but also a power steering system in which the operation of the operating member and the wheels are mechanically in conjunction with each other. In the power steering system, the increase in the vehicle behavior due to the resonance can be suppressed by reducing an assist force with respect to the operation angle in the limiting control, as compared with in the normal control. Further, one of the front-wheel steering device and the rear-wheel steering device may be of a power steering type while the other of the front-wheel steering device and the rear-wheel steering device may be of a steer-by-wire type, for instance. The front-wheel steering device may be of a power steering type, and the rear-wheel steering device may be of a steer-by-wire type. In this case, the limiting control may be executed for the rear-wheel steering device. Because the subject for which the limiting control is executed is a steer-by-wire steering system, the actual steering angle can be more freely limited without taking account of an influence on the driver's operation. The present disclosure is applicable to a steering system in which the operation of an operating means (the steering wheel) and the control of the steering angle of the wheel are independent of each other, such as a variable gear ratio steering (VGRS).

What is claimed is:

1. A steering system, comprising:
at least one of a front-wheel steering device configured to steer a front wheel and a rear-wheel steering device configured to steer a rear wheel; and
a controller configured to control the front-wheel steering device or the rear-wheel steering device based on a steering request,
wherein the controller is configured to:
calculate a target steering angle based on the steering request;
calculate a steering-related frequency that is a frequency of a steering variable related to steering;
determine whether the steering-related frequency falls within a predetermined resonance frequency band;
execute a normal control in which the controller controls the front-wheel steering device or the rear-wheel steering device based on the target steering angle when it is determined that the steering-related frequency falls outside the resonance frequency band; and
execute a limiting control when it is determined that the steering-related frequency falls within the resonance frequency band, and
wherein, in the limiting control, the controller controls the front-wheel steering device or the rear-wheel steering device such that (i) an actual steering angle is constant at a predetermined value, (ii) an absolute value of the actual steering angle gradually decreases from a specific value, (iii) a frequency of the actual steering angle falls outside the resonance frequency band, or (iv) the absolute value of the actual steering angle is less than an absolute value of the latest value of a target extreme value that is an extreme value of the target steering angle.

2. The steering system according to claim 1,
wherein the controller is configured to:

calculate a steering-variable extreme value that is an extreme value of the steering variable; and calculate the steering-related frequency based on a time period from occurrence of the steering-variable extreme value to next occurrence of the steering-variable extreme value.

3. The steering system according to claim 1, wherein, in the limiting control, the controller controls the front-wheel steering device or the rear-wheel steering device such that the actual steering angle is constant at the predetermined value, and wherein an absolute value of the predetermined value is less than the absolute value of the latest value of the target extreme value that is the extreme value of the target steering angle.

4. The steering system according to claim 3, wherein the predetermined value is 0.

5. The steering system according to claim 1, wherein, in the limiting control, the controller controls the front-wheel steering device or the rear-wheel steering device such that the absolute value of the actual steering angle gradually decreases from the specific value, and wherein an absolute value of the specific value is less than the absolute value of the latest value of the target extreme value that is the extreme value of the target steering angle.

6. The steering system according to claim 1, wherein the front-wheel steering device or the rear-wheel steering device to be controlled by the controller is a steering device of a steer-by-wire type that is mechanically independent of an operation force of an operating member and is configured to steer a wheel based on a force of a steering motor.

7. The steering system according to claim 1, wherein, in the limiting control, the controller controls the front-wheel steering device or the rear-wheel steering device based on a limited target steering angle obtained by modifying the target steering angle.

8. The steering system according to claim 6, wherein, in the limiting control, the controller changes a parameter utilized in calculation relating to the steering motor.

9. The steering system according to claim 1, wherein the controller is configured to execute the normal control for the front-wheel steering device irrespective of the steering-related frequency and to selectively execute the normal control and the limiting control for the rear-wheel steering device based on the steering-related frequency and the resonance frequency band.

* * * * *